United States Patent
Judd

(10) Patent No.: US 12,469,192 B2
(45) Date of Patent: Nov. 11, 2025

(54) AUTOMATICALLY GENERATING ELECTRONIC FILES BASED ON AGGREGATED INFORMATION FROM RECORDS

(71) Applicant: Truist Bank, Charlottte, NC (US)

(72) Inventor: Kathlene Judd, Raleigh, NC (US)

(73) Assignee: Truist Bank, Charlotte, NC (US)

( * ) Notice: Subject to any disclaimer, the term of this patent is extended or adjusted under 35 U.S.C. 154(b) by 291 days.

(21) Appl. No.: 18/126,632

(22) Filed: Mar. 27, 2023

(65) Prior Publication Data

US 2024/0331229 A1    Oct. 3, 2024

(51) Int. Cl.
*G06T 11/20*    (2006.01)
*G06F 16/538*   (2019.01)
*G06T 11/60*    (2006.01)

(52) U.S. Cl.
CPC .......... *G06T 11/206* (2013.01); *G06F 16/538* (2019.01); *G06T 11/60* (2013.01)

(58) Field of Classification Search
CPC ...... G06T 11/206; G06T 11/60; G06F 16/538; G06F 16/248
See application file for complete search history.

(56) References Cited

U.S. PATENT DOCUMENTS

| | | | | |
|---|---|---|---|---|
| 6,405,207 B1 * | 6/2002 | Petculescu | ............ | G06F 16/283 707/999.005 |
| 10,885,020 B1 * | 1/2021 | Ablitt | .................. | G06F 16/2365 |
| 11,386,107 B1 * | 7/2022 | Walker | .................. | G06F 16/211 |
| 2013/0298244 A1 * | 11/2013 | Kumar | ..................... | G06F 21/51 726/25 |
| 2015/0177964 A1 * | 6/2015 | Spirer | .................. | G06F 16/4393 715/732 |
| 2017/0083576 A1 * | 3/2017 | Guan | ................... | G06F 16/2358 |
| 2017/0177608 A1 * | 6/2017 | Cismas | ................. | G06F 16/182 |
| 2019/0079980 A1 * | 3/2019 | Mallah | .................. | G06F 3/0481 |
| 2019/0265852 A1 * | 8/2019 | Bax | ........................ | G06F 3/0484 |
| 2022/0292250 A1 * | 9/2022 | Sharzer | ................. | G06F 3/0482 |
| 2023/0206348 A1 * | 6/2023 | Reddy | .................. | G06Q 40/125 705/30 |
| 2024/0184781 A1 * | 6/2024 | Conrad | ................. | G06Q 10/105 |
| 2025/0016218 A1 * | 1/2025 | Zhang | ..................... | H04L 67/06 |

OTHER PUBLICATIONS

Wen T. Data aggregation. Encylopedia of Big Data. Springer, Cham. 2020. (Year: 2020).*

* cited by examiner

*Primary Examiner* — Xiao M Wu
*Assistant Examiner* — Latrell Anthony Creary
(74) *Attorney, Agent, or Firm* — Kilpatrick Townsend & Stockton LLP; Michael A. Springs, Esq.

(57) ABSTRACT

A computing device can transmit a query to a database system that includes a database of records. The computing device can receive, from the database system, a plurality of search results identifying a subset of records in the database that match the query. The computing device can generate, based on the search results, aggregated information by aggregating together values from the subset of records. The computing device can automatically generate at least a portion of an electronic file having at least one graphical object generated based on the aggregated information.

18 Claims, 3 Drawing Sheets

AUTOMATICALLY GENERATING ELECTRONIC FILES BASED ON AGGREGATED INFORMATION FROM RECORDS

TECHNICAL FIELD

The present disclosure relates generally to electronic files with graphics. More specifically, but not by way of limitation, this disclosure relates to automatically generating electronic files that may include graphics based on aggregated information from records.

BACKGROUND

A database system can host a database having one or more records. The database system can perform, based on a request from a user, a search for records in the database, and can enable the user to manually retrieve the records from the database system. The records can include a large amount of raw and unstructured data. In some cases, the records can include sensitive or personally-identifying information.

DETAILED DESCRIPTION

Figure 1:
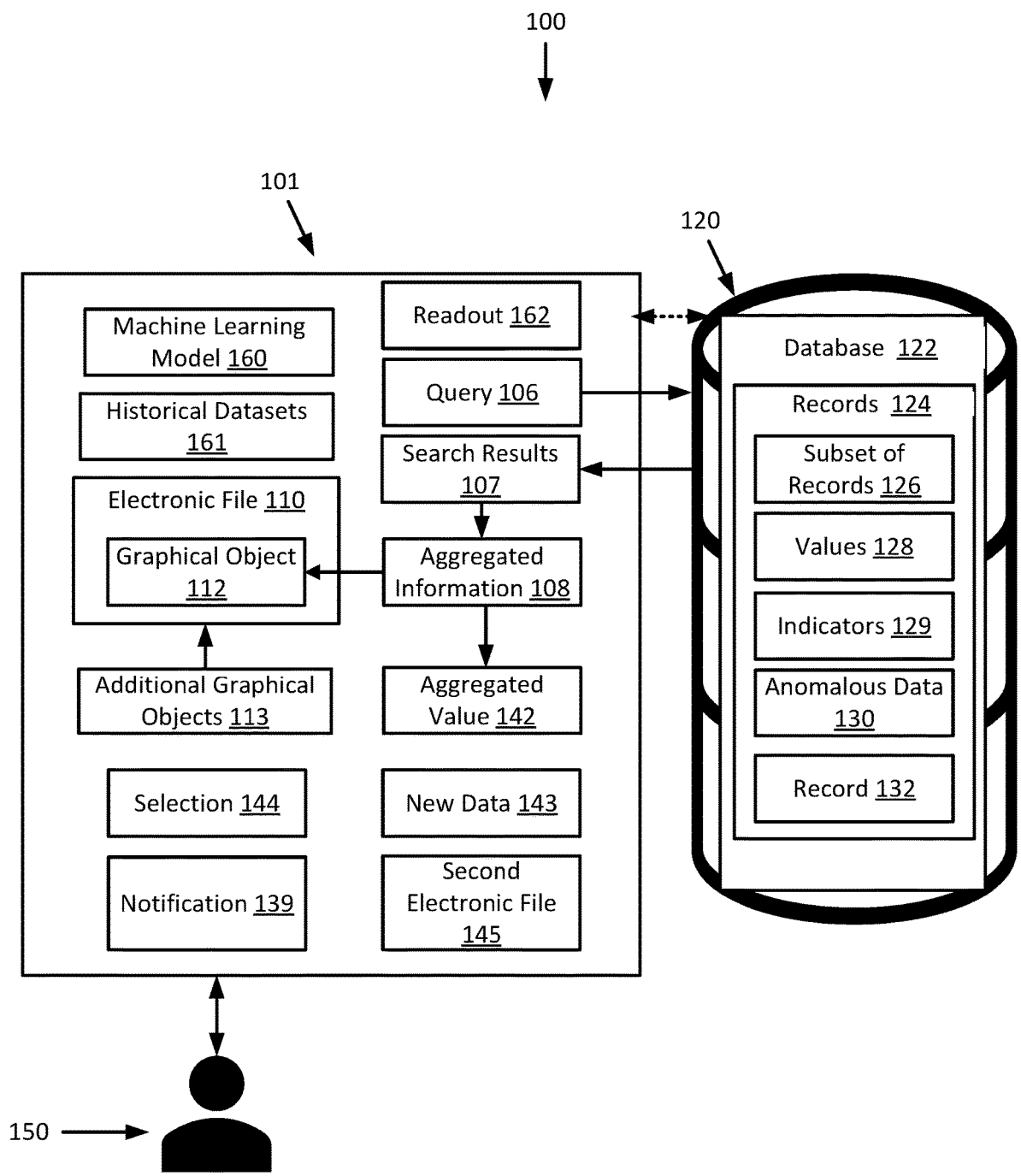
FIG. 1 is a block diagram of a system that can automatically generate electronic files based on aggregated information from records according to some aspects of the present disclosure.

A database executing on a database system can store records. In some examples, the records can include contracts and data associated therewith. Each record can indicate an entity, such as a cost center, that the record may be associated with. It may be desirable to easily aggregate information from the records and export the aggregate information as a graphic in a user-friendly and accessible manner. But there is currently no efficient way to do so. In a conventional scenario, a user may need to issue a search query for relevant records, manually open each record returned in response to the search query, obtain the desired data from each record, manually aggregate that data together, and then manually create a graphic representing the aggregated data. This is a slow and tedious process that can consume excessive amounts of computing resources, such as network bandwidth, cache memory, and RAM. For example, accessing and exporting information from each individual record may consume the bandwidth, cache memory and RAM associated with the user's device. Generating a graphic from said information can also consume processing power and memory of the user's device. Beyond consuming significant amounts of computing resources, the above approach may be underinclusive and therefore miss important records and data. For example, there may be additional records related to the entity that may not be included in the search results for a given search query. Furthermore, once the graphics have been manually generated, unless they are manually updated over time to account for new or changed information, they may become outdated and inaccurate. Another issue that can negatively impact this manual process is that the records may include anomalous data. For example, the anomalous data can include erroneously entered, improperly formatted, or otherwise incomplete information.

Some examples of the present disclosure can overcome the aforementioned problems by automatically generating an electronic file (or a portion thereof) with one or more graphical objects based on aggregated information from a subset of records. For example, a computing system can transmit a query to a database system. The query can include a search term, such as an identification number or text string. In some examples, the query can include multiple search terms. The computing system can receive search results from the database system that can identify a subset of records in the database that match the query. The computing system can, based on the search results, automatically generate aggregated information by aggregating together values from the subset of records. The computing system may then automatically generate at least a portion of the electronic file having at least one graphical object generated based on the aggregated information. The graphical object may be a static image (e.g., a JPG file) or a dynamic image (e.g., an animation like a GIF file) that is automatically generated based on the aggregated information.

For example, the computing system can automatically generate one or more slides having graphical objects in a slide deck file or any other suitable file that is compatible with electronic presentation software. To do so, the computing system may automatically render the graphical objects with rendering software and then embed the rendered graphical objects into the file. As another example, the computing system can automatically generate a spreadsheet or a portion of a spreadsheet that can include the graphical objects. In some examples, the spreadsheet can include data associated with the subset of records. The graphical objects can include pie charts, bar charts, icons, or any other suitable arrangements of graphics that can be used to depict information associated with the record. In some examples, the data can be color-coded. For example, a user can specify a color scheme for certain ranges of values, and the computing system can apply the color scheme based on values associated with a record prior to displaying the data. In some examples, the data can be automatically color-coded according to predefined settings (e.g., to comply with brand colors, etc.).

In some examples, the computing system can determine that a record in the subset of records contains anomalous data. To correct the anomalous data, the computing system can transmit a notification to a user indicating that the record contains anomalous data. The user can then transmit new data to the computing system. The computing system can receive the new data and analyze the new data to determine that the new data is not anomalous. If the new data is determined to be non-anomalous, the computing system can replace the anomalous data in the record with the new data provided by the user. Furthermore, the computing system can automatically update any graphical objects that may be associated with the anomalous data. In this way, the computing system can facilitate the automated detection and correction of anomalous data and corresponding graphics, which may prevent the anomalous data from negatively impacting the graphics or other tasks.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of a system 100 that can generate electronic files based on aggregated information 108 from records 124 according to some aspects of the present disclosure. The system 100 can include a computing system 101 that can include one or more processors and one or more memories that can include instructions that can be executed by the one or more processors. In some examples, the computing system 101 can be housed in one computing device. In some examples, the computing system 101 can be distributed across multiple computing devices, such as servers (e.g., virtual machines or physical machines), desktop computers, etc. The computing system 101 can communicate with a database system 120. In some examples, the computing system 101 can communicate with a user 150 via their user device, which may include a laptop computer, desktop computer, tablet, e-reader, smart watch, smart phone, etc.

The computing system 101 can transmit a query 106 to the database system 120 for accessing a database 122 of records 124. The query 106 can include a search term, such as an identification number or text string that may be unique to a given record 132 or subset of records 126. The computing system can receive search results 107 from the database system 120 that can identify a subset of records 126 in the database 122 that match the query 106. In some examples, the query 106 can include multiple search terms, and identifying the subset of records 126 can involve determining that each record in the subset of records 126 matches a set of criteria specified by the multiple search terms.

The computing system 101 can, based on the search results 107, generate aggregated information 108 by aggregating together values (e.g., numerical values) from the subset of records 126. For example, the computing system 101 can generate the aggregated information 108 by retrieving values 128 from the subset of records 126 and performing one or more mathematical operations on the values 128. For example, the aggregated information 108 can include one or more arithmetic means or medians of values 128 in the subset of records 126. In some examples, the computing system 101 can generate the aggregated information 108 by generating new values based on the values 128 from the subset of records 126 and storing the new values in a data structure. In some examples, the computing system 101 can generate the aggregated information 108 automatically. In other examples, the computing system 101 can generate the aggregated information 108 in response to a user input. In some examples, the computing system 101 can generate the aggregated information 108 based on a user-specified configuration or setting. For example, a user 150 can specify a method by which the computing system 101 can generate the aggregated information 108. In some examples, the computing system 101 can include a configuration file that can indicate which information from the subset of records 126 is to be aggregated by the computing system 101 to generate the aggregated information 108.

The computing system 101 can automatically generate at least one graphical object 112 generated based on the aggregated information 108. The graphical object 112 can be a graphical representation of the aggregated information 108 and can convey they aggregated information 108 in a graphical format. In some examples, the computing system 101 can include a configuration file that the computing system 101 can use to determine stylistic elements of the graphical object 112. In some examples, the graphical object 112 can be color-coded based on the aggregated information 108. For example, the computing system 101 can determine a color of the graphical object 112 based on values contained in the aggregated information 108. In some examples, the computing system 101 can determine various characteristics of the graphical object 112 and then operate rendering software to render the graphical object 112. The rendering software may render the graphical object 112 as a two-dimensional graphic or a three-dimensional graphic. The graphical object 112 may be static or dynamic. For example, the graphical object 112 may include a sequence of frames that depict the graphic changing over time (e.g., like an animation).

Once the graphical object 112 has been generated, the computing system 101 can incorporate the graphical object 112 into the electronic file 110. For example, the computing system 101 can embed the graphical object 112 as an image within a slideshow or an electronic document, such as a PDF file. If the slideshow or an electronic document does not already exist, the computing system 101 can automatically create a default version of the slideshow or electronic document (e.g., using default settings) on a hard disk or other storage device. The computing system 101 can then incorporating the graphical object 112 at a predefined location within the slideshow or electronic document by modifying the default version on disk. If the slideshow or electronic document already exists, the computing system 101 can automatically identify the file, open it, and then modify it to include the graphical object 112.

In some examples, the computing system 101 can incorporate the graphical object 112 into the electronic file 110 by positioning the graphical object 112 within the electronic file 110 at a predefined location, such as at predefined coordinates or on a predefined page. The predefined location may be user customizable, for example by updating a configuration file or setting. Incorporating the graphical object 112 into the electronic file 110 can involve specifying one or more dimensions associated with the graphical object 112, specifying one or more coordinates that can define the position of the graphical object 112 within the electronic file 110, or specifying any other suitable parameters associated with the graphical object 112. The computing system 101 can identify a file location at which the electronic file 110 is stored for use in incorporating the graphical object 112 within the electronic file 110. For example, the file may be located in a predefined storage location that is known to the computing system 101. Alternatively, the computing system 101 can perform a search for the electronic file 110 and incorporate the graphical object 112 within the electronic file 110 once the electronic file 110 has been located.

In some examples, the computing system 101 can automatically export the aggregated information 108 into a second electronic file 145 that is separate from the first electronic file 110. For example, the computing system 101 can automatically export the aggregated information 108 into a spreadsheet. That way, the user 150 can be provided with two versions of the aggregated information 108—one version in the first electronic file 110 that depicts the aggregated information 108 in graphical form, and another version in the second electronic file 145 that has the raw aggregated information 108 in numerical form.

In some examples, it may be desirable to provide a user 150 with information derived from certain records in the subset of records 126, without providing the user 150 with the raw information (e.g., raw numerical values) itself from the records, which may be sensitive. To that end, in some examples, the computing system 101 can determine that a user 150 lacks permission to view the raw information (e.g., numerical values) in the subset of records 126. In response to making this determination, the computing system 101 can perform one or more anonymization operations on the raw information to obscure the sensitive information therein. For example, the computing system 101 can perform one or more mathematical operations on a set of raw numerical values to produce an aggregated value 142. The aggregated value 142 can be, for example, an average of the raw numerical values. In some examples, the aggregated value 142 can be devoid of personally identifying information. The mathematical operation can involve stripping the raw numerical values of personal identifying information or other information that can be used to de-anonymize the data.

In some examples, the computing system 101 can determine that one or more other records 124 are related to the subset of records 126 that were returned in response to the query 106. The other records 124 may not have been returned in response to the query 106. For example, the other records 124 may not have included a search term used in the query 106, and therefore may have been excluded from the search results 107. Determining that the one or more other records 124 are related to the records in the subset of records 126 can involve receiving one or more indicators 129 associated with the one or more other records 124. In some examples, determining that the one or more other records 124 are related to the records in the subset of records 126 can also involve determining, based on the one or more indicators 129, that the one or more other records 124 are associated with the entity. For example, the computing system 101 can read the one or more indicators 129 to determine that the one or more other records 124 are associated with the entity. In some examples, the computing system 101 can store a copy of the one or more indicators 129 in a local memory to decrease a number of requests made to the database system 120. The computing system 101 can retrieve the other records 124 from the database 122. For example, the computing system 101 can transmit a request to the database system 120 to access the other records 124 in the database 122. The computing system 101 can generate one or more additional graphical objects 113 based on the other records 124. After generating the one or more additional graphical objects 113, the computing system 101 can incorporate the one or more additional graphical objects 113 into the electronic file 110. In some examples, the subset of records 126 can be associated with an entity, such as a cost center or an institution. Each record 132 in the subset of records can include an indicator 129, such as metadata, that can indicate the relationship between the record 132 and the entity. For example, the record 132 can include a string of text indicating that the record 132 is associated with a particular entity.

The electronic file 110 can be stored on a storage device, such as a hard drive or hard disk, and downloadable by the user 150 to their user device via network, such as the Internet. The user 150 may then open and view the electronic file using specialized software on their user device. In some examples, the electronic file 110 can be a slide deck file or presentation file (e.g., a PowerPoint presentation). The slide deck file can be used in conjunction with a presentation software to display the at least one graphical object 112. The slide deck file can include one or more slides that can include arrangements of graphics. In some examples, the computing system 101 can incorporate the at least one graphical object 112 into one or more slides of the slide deck file. In some examples, the computing system can receive a selection 144 of a file format for the electronic file 110. The computing system can generate the electronic file 110 in accordance with the selected file format.

In some examples, the computing system 101 determine that a record 132 in the subset of records 126 has been adjusted. Determining that the record 132 has been adjusted can involve monitoring the database system 120 (e.g., by polling the database system 120) to determine whether or not the record 132 has changed. The computing system 101 can automatically adjust, based on the adjusted record 132, a graphical object 112 associated with the record 132. In some examples, the computing system 101 can adjust the graphical object 112 in response to determining that the record 132 has been adjusted. For instance, the computing system 101 can render an updated version of the graphical object 112 based on a changes to the record 132. The computing system 101 can then update the first electronic file 110 to include the updated version of the graphical object 112. This may involve replacing the prior version of the graphical object 112 with the updated version (e.g., so that there is only one version of the graphical object 112 in the first electronic file 110), or incorporating the updated version of the graphical object 112 into the first electronic file 110 without removing the prior version of the graphical object 112 (e.g., so that there are multiple versions of the graphical object 112 in the first electronic file 110).

In some examples, the computing system 101 can determine that a record 132 in the subset of records 126 contains anomalous data 130. The computing system can transmit a notification 139 to a user 150 indicating that the record 132 contains anomalous data 130. In some examples, the notification 139 can be a mobile application notification, and the computing system 101 can transmit the notification 139 to the user via a user device. The computing system 101 can prompt the user 150 for new data 143 that can replace the anomalous data 130. For example, an application executing on the user device can display an input prompt in response to a request from the computing system 101 to display the input prompt. The computing system 101 can receive new data 143 from the user 150. In some examples, the computing system 101 can determine that the new data 143 is non-anomalous. The computing system 101 can replace the anomalous data 130 with the new data 143. For example, the computing system 101 can replace the anomalous data 130 with the new data 143 in response to determining that the new data 143 is non-anomalous.

In some examples, the computing system 101 can determine that the record 132 contains anomalous data by accessing a machine learning model 160. In some examples, the machine learning model 160 can include a neural network. The machine learning model may have been trained on historical datasets 161. The historical datasets 161 can be labeled historical datasets 161 that can include pairs of labels and values that the machine learning model 160 can use to classify data as anomalous or non-anomalous. The computing system 101 can provide a record 132 as an input to the machine learning model 160. The machine learning model 160 can generate a result based on the record 132. Based on the result, the computing system 101 can determine that the record contains anomalous data 130.

In some examples, the computing system 101 can generate a search interface that can be displayed to a user 150. The search interface can be a graphical user interface that can enable the user 150 to modify or add search terms to the query 106. For example, the user 150 can use the search interface to adjust the query 106 for narrowing or broadening the search results 107. In some examples, the search terms can include contracts, invoices, or a combination of both.

In some examples, the computing system 101 can track user activity data corresponding to one or more users 150 that may be associated with one or more records in the subset of records 126. The computing system 101 can detect discrepancies that may be present in certain records in the subset of records 126. For example, the computing system 101 can determine a discrepancy between a time entry associated with a user 150 and an invoice entry associated with the user 150. The computing system 101 can automatically generate, based on the user activity data of the users 150, a list of users 150 that have discrepancies in their user activity data. In some examples, the computing system 101 can generate the list periodically. The computing system 101 can generate a graphical user interface based on the list for displaying the list to a user 150. In some examples, the graphical user interface can include a form that the user 150 can fill out to generate a request. For example, the user 150 can fill out the form to generate a request to modify a record 132 in the subset of records 126.

In some examples, the computing system 101 can generate a readout 162 that can include data associated with the subset of records 126. In some examples, the readout 162 can include the list of users 150 that have discrepancies in the subset of records 126 that are associated with their respective user activity data. The computing system 101 can generate a graphical user interface based on the readout 162. The computing system can automatically resubmit the query 106 and update the readout 162 and the graphical user interface based on the results of updated aggregated information 108 from the resubmitted query 106. In some examples, the computing system 101 can update the graphical object 112 based on the aggregated information 108 from the resubmitted query 106.

In some examples, the readout 162 can indicate records in the subset of records 126 whose values may have exceeded a predefined threshold. Alternatively, the readout 162 can indicate records in the subset of records 126 whose values are approaching a predefined threshold. For example, the readout 162 can indicate a record 132 in the subset of records 126 can have a date that is approaching or has exceeded a predefined date. The readout 162 can indicate the record 132 by including a title, index, or value associated with the record 132 in the readout 162.

In some examples, the computing system 101 can access or execute an artificial intelligence (AI) assistant. The AI assistant can be a software program that can leverage artificial intelligence or machine learning capabilities to provide assistance to a user 150. In some examples, the AI assistant can provide the user 150 with a recommendation based on information in the subset of records 126. The AI assistant can generate prompts for a user 150 and receive inputs from the user 150. The AI assistant can monitor the subset of records 126 to detect events associated with the subset of records 126. The AI assistant can include a chatbot that can provide notifications to the user 150 based on the subset of records 126. In some examples, the chatbot can transmit information from the readout 162 to the user 150 via chat messages. In some examples, the AI assistant can leverage natural language processing capabilities that can enable the user 150 to perform operations on the subset of records 126 based on a text or speech input from the user 150. For example, the chatbot can receive a text message from the user 150 and the computing system 101 can interpret the text message to generate an operation. The computing system 101 can, subsequent to generating the operation, perform the operation.

Figure 2:
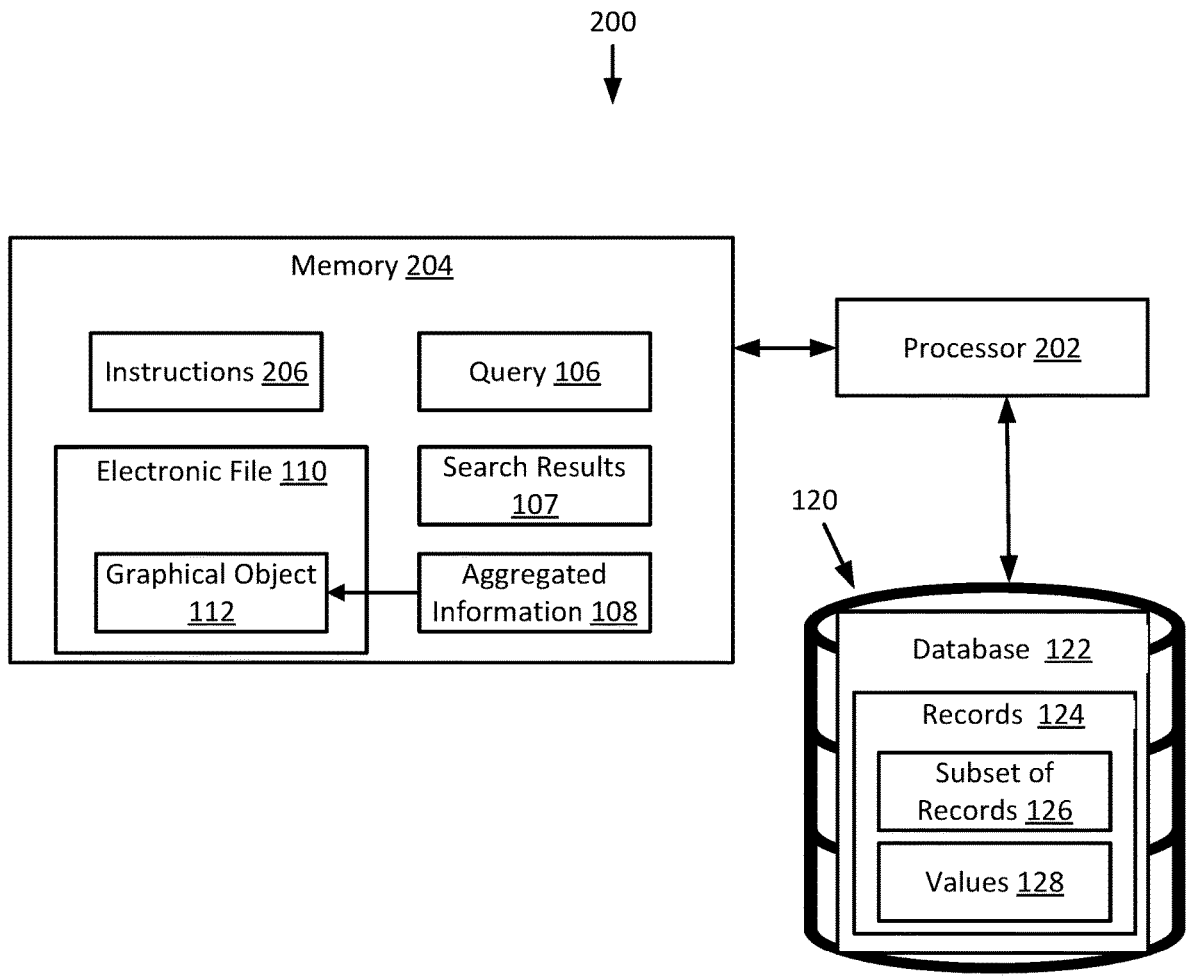
FIG. 2 is a block diagram of a system that can automatically generate electronic files based on aggregated information from records according to some aspects of the present disclosure.

FIG. 2 is a block diagram of an example of a system 200 that can generate electronic files based on aggregated information from a subset of records according to some aspects of the present disclosure. The system 200 can include a processor 202 coupled to a memory 204. The processor 202 can include one processor or multiple processors. Examples of the processor 202 include a Field-Programmable Gate Array (FPGA), an application-specific integrated circuit (ASIC), and a microprocessor. The processor 202 can execute instructions 206 stored in the memory 204 to perform one or more operations. In some examples, the instructions 206 can include processor-specific instructions generated by a compiler or an interpreter from code written in any suitable computer-programming language, such as C, C++, C#, and Java.

The memory 204 can include one memory device or multiple memory devices. The memory 204 can be volatile or non-volatile, in that the memory 204 can retain stored information when powered off. Examples of the memory 204 include electrically erasable and programmable read-only memory (EEPROM), flash memory, or any other type of non-volatile memory. At least a portion of the memory device includes a non-transitory computer-readable medium. A computer-readable medium can include electronic, optical, magnetic, or other storage devices capable of providing the processor 202 with the instructions 206 or other program code. Non-limiting examples of a computer-readable medium include magnetic disks, memory chips, ROM, random-access memory (RAM), an ASIC, a configured processor, optical storage, or any other medium from which a computer processor can read the instructions 206. The processor 202 can communicate with a database system 120. For example, the processor 202 can transmit requests to the database system 120 to retrieve information. In some examples, the processor 202 can communicate with a user 150 via their respective user device.

In some examples, the processor 202 can transmit a query 106 to the database system 120 for accessing a database 122 of records 124. The query 106 can include search criteria to be matched to one or more records in the database 122. For example, the query 106 can include a search term, such as an identification number or text string that may be unique to a given record 132 or subset of records 126. The computing system can receive search results 107 from the database system 120. The search results 107 can identify a subset of records 126 in the database that match the query 106. In some examples, the query 106 can include multiple search terms, and identifying the subset of records 126 can involve determining that each record in the subset of records 126 matches a set of criteria specified by the multiple search terms. The processor 202 can, based on the search results 107, generate aggregated information 108 by aggregating together values from the subset of records. The processor 202 can automatically generate at least a portion of the electronic file 110 having at least one graphical object 112 generated based on the aggregated information 108.

Figure 3:
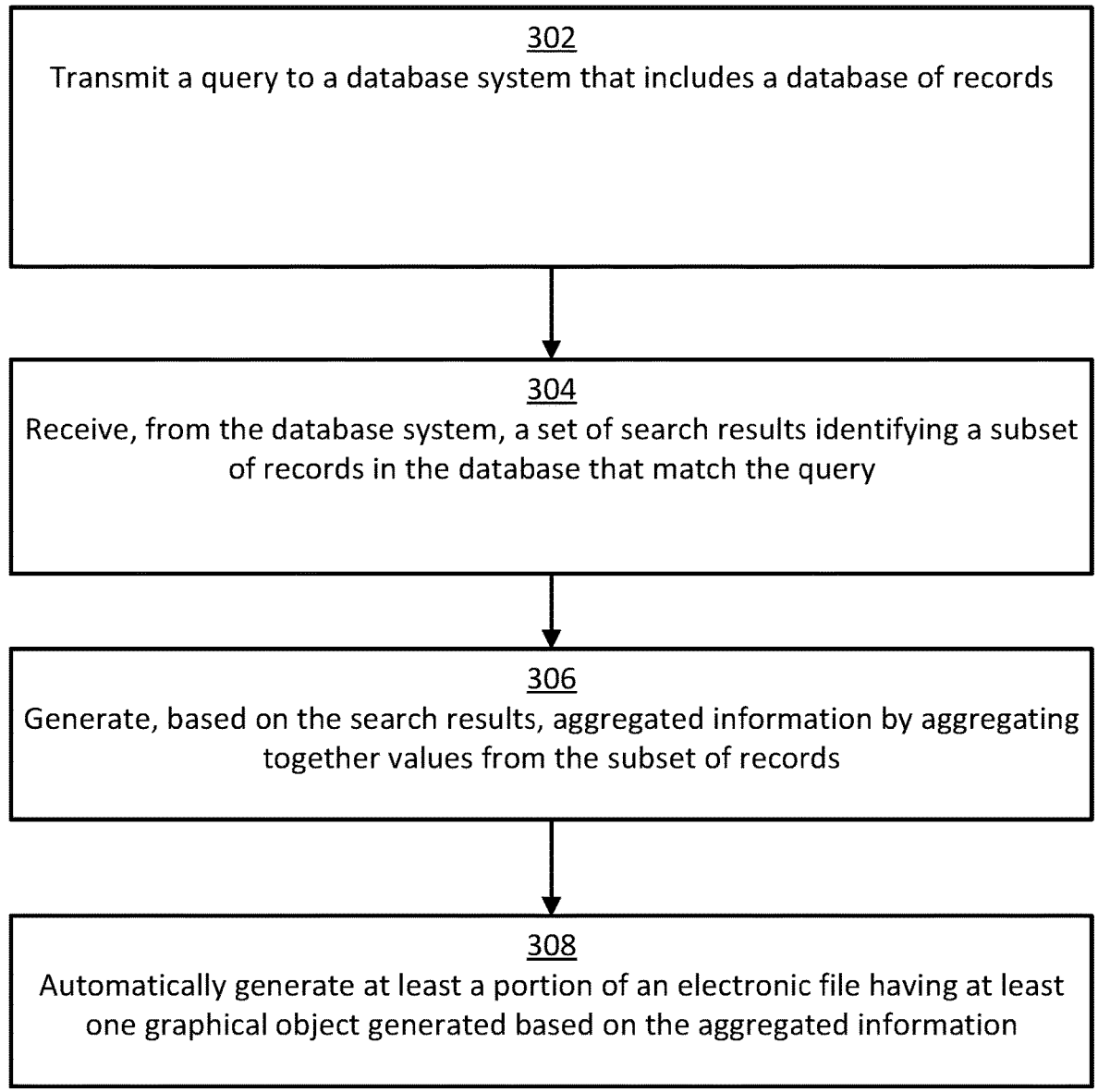
FIG. 3 is a flowchart of a process that can automatically generate electronic files based on aggregated information from records according to some aspects of the present disclosure.

FIG. 3 is a flowchart of a process 300 that can generate electronic files based on aggregated information from records according to some aspects of the present disclosure. Other examples may include more operations, fewer operations, different operations, or a different order of operations than is shown in FIG. 3.

At block 302, a processor 202 can transmit a query 106 to a database system 120. The database system 120 can include a database 122 of records. The query can include one or more search terms for identifying records 132 that may be relevant to a search. For example, the processor 202 can incorporate one or more keywords into a search for records matching the keywords. The query 106 can include a request for the database system 120 to perform a search on the database 122.

At block 304, the processor 202 can receive, from the database system 120, a set of search results. The search results can identify a subset of records 126 in the database that match the query. In some examples, the search results can include the records in the subset of records.

At block 306, the processor 202 can generate, based on the search results, aggregated information by aggregating together values from the subset of records. Aggregating together values from the subset of records can involve applying one or more mathematical operations to numerical values corresponding to one or more fields in the subset of records. In some examples, the aggregated information can exclude sensitive information that may be present in certain records.

At block 308, the processor 202 can automatically generate least a portion of an electronic file having at least one graphical object generated based on the aggregated information. The electronic file can be a slide deck file or any other suitable type of electronic presentation file. The graphical object can include one or more graphical visualizations, such as a pie chart, a bar chart, or any other suitable graphical object that can represent data in a graphical format.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A computer-implemented method comprising:
    transmitting, by a processor, a query to a database system that includes a database of records;
    receiving, by the processor and from the database system, a plurality of search results identifying a subset of records in the database system that match the query;
    generating, by the processor and based on the search results, aggregated information by aggregating together values from the subset of records, wherein generating the aggregated information comprises:
        determining that a user associated with the query lacks permission to view a set of raw numerical values in the subset of records; and
        in response to determining that the user lacks permission to view the set of raw numerical values, performing one or more mathematical operations on the set of raw numerical values to produce an aggregated value, wherein the aggregated information excludes the set of raw numerical values and includes the aggregated value; and
    automatically generating, by the processor, at least a portion of an electronic file having at least one graphical object generated based on the aggregated information.

2. The computer-implemented method of claim 1, further comprising:
    determining, by the processor, that one or more other records in the database system are related to the subset of records returned in response to the query, the subset of records excluding the one or more other records;
    retrieving, by the processor and from the database system, the one or more other records; and
    generating, by the processor, one or more additional graphical objects based on the one or more other records; and
    incorporating, by the processor, the one or more additional graphical objects into the electronic file.

3. The computer-implemented method of claim 2, wherein the subset of records are associated with an entity, and wherein determining that the one or more other records in the database system are related to the subset of records comprises:
    receiving, by the processor and from the database system, one or more indicators associated with the one or more other records; and
    determining, by the processor and based on the one or more indicators, that the one or more other records in the database system are associated with the entity.

4. The computer-implemented method of claim 1, further comprising, after automatically generating the at least one graphical object:
    determining, by the processor, that a record in the subset of records has changed; and
    based on determining that the record has changed, automatically updating, by the processor, the at least one graphical object in the electronic file to reflect the change to the record.

5. The computer-implemented method of claim 1, further comprising:
    determining, by the processor, that a record in the subset of records contains anomalous data;
    transmitting, by the processor and to a user, a notification that the record contains anomalous data; and
    prompting, by the processor, the user for new data that is usable to replace the anomalous data;
    receiving, by the processor and from the user, the new data;
    determining, by the processor, that the new data is non-anomalous; and
    replacing, by the processor, the anomalous data with the new data in the record.

6. The computer-implemented method of claim 5, wherein determining, by the processor, that the record contains anomalous data comprises:
    accessing, by the processor, a machine learning model that has been trained on labeled historical datasets;
    providing, by the processor, the record as an input to the machine learning model;
    retrieving, by the processor, a result from the machine learning model; and
    determining, by the processor and based on the result, that the record contains anomalous data.

7. The computer-implemented method of claim 1, wherein the electronic file is a slide deck file having one or more slides, and further comprising:
    incorporating, by the processor, the at least one graphical object into the one or more slides of the slide deck file.

8. The computer-implemented method of claim 1, further comprising:
    receiving, by the processor, a selection of a file format for the electronic file; and
    generating, by the processor, the electronic file with the graphical object in accordance with the selected file format.

9. The computer-implemented method of claim 1, wherein the electronic file is a first electronic file, and further comprising:

exporting, by the processor, the aggregated information to a second electronic file that is separate from the first electronic file.

10. A system comprising:

a processor; and a non-transitory computer-readable memory including instructions that are executable to:

transmit a query to a database system that includes a database of records;

receive, from the database system, a plurality of search results identifying a subset of records in the database system that match the query;

generate, based on the search results, aggregated information by aggregating together values from the subset of records, wherein generating the aggregated information comprises:

determining that a user associated with the query lacks permission to view a set of raw numerical values in the subset of records; and in response to determining that the user lacks permission to view the set of raw numerical values, performing one or more mathematical operations on the set of raw numerical values to produce an aggregated value, wherein the aggregated information excludes the set of raw numerical values and includes the aggregated value; and automatically generate at least a portion of an electronic file having at least one graphical object generated based on the aggregated information.

11. The system of claim 10, further comprising instructions that are executable by the processor to:

determine that one or more other records in the database system are related to the subset of records returned in response to the query, the subset of records excluding the one or more other records;

retrieve, from the database system, the one or more other records; and generate, one or more additional graphical objects based on the one or more other records; and incorporate, the one or more additional graphical objects into the electronic file.

12. The system of claim 11, wherein the subset of records are associated with an entity, and wherein determining that the one or more other records in the database system are related to the subset of records comprises:

receive, from the database system, one or more indicators associated with the one or more other records; and determine based on the one or more indicators, that the one or more other records in the database system are associated with the entity.

13. The system of claim 10, further comprising instructions that are executable by the processor to:

determine that a record in the subset of records has been adjusted; and automatically adjust, based on the adjusted record, a graphical object that is associated with the adjusted record in the electronic file.

14. The system of claim 10, further comprising instructions that are executable by the processor to:

determine that a record in the subset of records contains anomalous data;

transmit to a user a notification that the record contains anomalous data; and prompt the user for new data that is usable to replace the anomalous data;

receive, from the user, the new data;

determine that the new data is non-anomalous; and replace the anomalous data with the new data in the record.

15. The system of claim 14, wherein determining, that the record contains anomalous data comprises:

access a machine learning model that has been trained on labeled historical datasets;

provide the record as an input to the machine learning model;

retrieve a result from the machine learning model; and determine, based on the result, that the record contains anomalous data.

16. The system of claim 10, wherein the electronic file is a slide deck file having one or more slides, and further comprising instructions that are executable by the processor to:

incorporate the at least one graphical object into the one or more slides of the slide deck file.

17. The system of claim 10, further comprising instructions that are executable by the processor to:

receive a selection of a file format for the electronic file; and generate the electronic file with the graphical object in accordance with the selected file format.

18. A non-transitory computer-readable medium comprising instructions that are executable by a processor for causing the processor to:

transmit a query to a database system that includes a database of records;

receive, from the database system, a plurality of search results identifying a subset of records in the database system that match the query;

generate, based on the search results, aggregated information by aggregating together values from the subset of records, wherein generating the aggregated information comprises:

determining that a user associated with the query lacks permission to view a set of raw numerical values in the subset of records; and in response to determining that the user lacks permission to view the set of raw numerical values, performing one or more mathematical operations on the set of raw numerical values to produce an aggregated value, wherein the aggregated information excludes the set of raw numerical values and includes the aggregated value; and automatically generate at least a portion of an electronic file having at least one graphical object generated based on the aggregated information.

* * * * *